April 11, 1944. J. N. CLARK 2,346,554
CANOPY AND ARTICULATED FRAME
Filed June 1, 1942
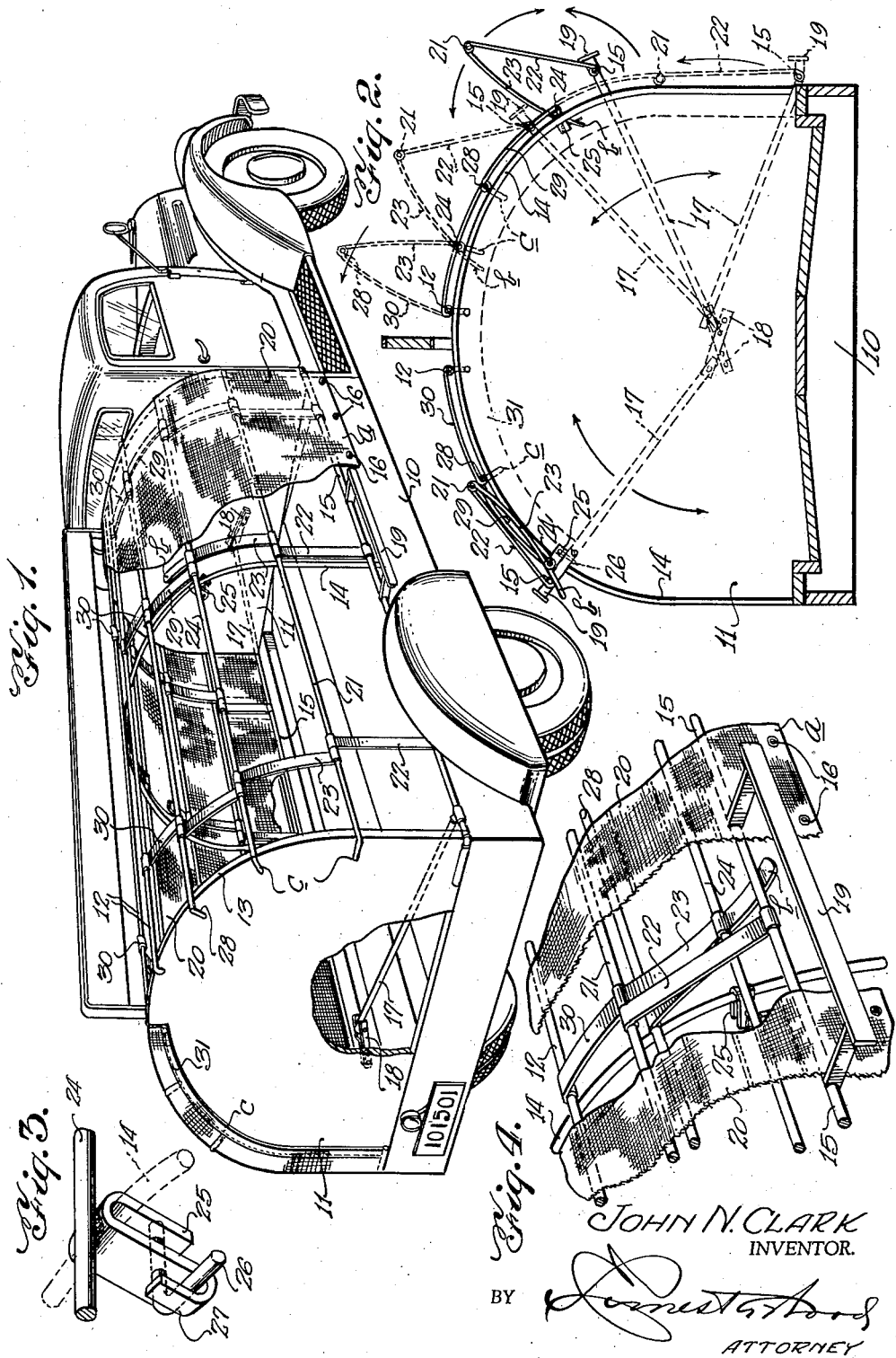
JOHN N. CLARK
INVENTOR.
BY
ATTORNEY Patented Apr. 11, 1944

2,346,554

UNITED STATES PATENT OFFICE 2,346,554

CANOPY AND ARTICULATED FRAME

John N. Clark, Dallas, Tex., assignor of fifty per cent to Ben E. Keith Company, Dallas, Tex.

Application June 1, 1942, Serial No. 445,295

8 Claims. (Cl. 296—100)

This invention relates to trucks, trailers and similar vehicles designed to haul merchandise and it has particular reference to a canopy and frame for such vehicles.

The principal object of the invention is to provide an articulated frame structure consisting of a plurality of longitudinal and relatively spaced rods, interconnected by link straps or stays to form a support for a conforming fabric cover, all of which is supported by the bed ends of the vehicle and by intermediate bows.

Another object of the invention is to so dispose the stays relative to each other and to the rods as to insure proper parallel spacing of the latter over the arcuate ends of the vehicle bed and to constrain alternate ones of said rods to describe a minor arc on individual axes supplied by the companion rods, due to the interconnecting stays, when the lowermost rod is manually operated.

Still another object of the invention is to provide means for securing certain of the rods against movement in order that selected sections of the canopy therebelow may be lifted to open but a portion of the canopy, usually for the purpose of unloading spot deliveries from the vehicle. Provision is further made for convenient release of the securing means to enable both sides of the canopy frame to be collapsed so that full access to the bed may be had for loading.

Still another object of the invention is to provide among the stays, one which is of greater length than the others, which is disposed in the intermediate group and whose extended end provides a leverage by means of which dead center position of folded sections of the frame can be readily overcome to close the canopy.

Broadly, the invention seeks to supplant the conventional tarpaulin cover for trucks and like vehicles by a canopy of uniform relative proportions which will obviate the distasteful work of readjusting the tarpaulin on the load each time a delivery or pick-up is made, which work is aggravated in inclement weather. Moreover, the canopy of the invention presents a much more pleasing appearance than the usual tarpaulin sheet cover and is more serviceable and lasting because it is held secure against whipping by the wind. In addition to the foregoing, a further feature is provided in that the interior of the vehicle is, to a great extent, sealed against external temperature influences which makes for more satisfactory hauling of refrigerated or perishable merchandise as well as merchandise requiring heat in transit.

With the foregoing objects as paramount, the invention has further reference to certain features of accomplishment, to become manifest as the description proceeds, taken in connection with the accompanying drawing, wherein:

Figure 1 is a rear perspective view of a truck showing the invention thereon, with portions broken away.

Figure 2 is a transverse section of the vehicle bed and the canopy frame, and parts of the canopy per se being shown in broken line.

Figure 3 is a detail view in perspective of the clamp for selectively securing the sections of the canopy against raising, and Figure 4 is a fragmentary view of the canopy and frame showing the temporary support afforded by an elongated stay, to expedite closing of the canopy.

Continuing with a more detailed description of the drawing, reference is primarily made to Figure 1 wherein is shown a truck body 10. There is no limitation intended by the specific showing of a truck since it will become manifest that the invention is equally adaptable in any case where a collapsible cover is necessary or desirable.

At either end of the body 10, arcuate shaped end members 11 are provided. These end members are stabilized by stationary and relatively parallel rods 12 serving in the capacity of ridge poles. The ends of these rods are welded or otherwise suitably secured to metal bands 13 embracing the edges of the end members 11. Disposed midway between the ends 11 is a bow 14 to which the ridge rods 12 are secured. More than one of these bows may be provided, to provide an intermediate support for the frame assembly, depending upon the length of the body on which the canopy is mounted.

The collapsible portions of the frame consist of the lowermost or selvedge rod 15 whose weight is sufficient to hold the canopy in closed position, although provision is made through the medium of eyelets 16 in the protective skirts a of the canopy to secure the same to the body 10 if and when required. There are two of such rods 15, one for each side of the canopy. Each rod is constrained to move in relation to the arcuate curve of the end members 11 by an arm 17 connected adjacent to the end of the rod and having its inner end pivoted to a bracket 18 affixed to an end member 11. It is to be observed that the positioning of the bracket 18 on the member 11 is important to insure proper relation of the rod 15 to the edge of the end member 11 throughout its travel thereon. Moreover, the bracket at the rear end of the body 10 is mounted on the inside, to provide an unobstructed space for a sign and for appearances, while the bracket at the opposite end is outside. Thus the arm 17 of the first bracket moves over the inside surface of the end member 11 while the corresponding arm 17 operates over the outside of the front end member 11. Handles 19 are secured to the rods 15 intermediate their ends for manually raising and lowering the canopy 20 by manipulating the rod 15.

Immediately above the lowermost rod 15 is another rod 21. This rod is rotatably connected to the rod 15 by narrow straps 22 which will be hereinafter referred to as stays. These stays are simultaneously thrust upwardly when the rod 15 is elevated by the handle 19 and in being thus displaced, as represented at the right of Figure 2, stays 23 are rotated about an axis supplied by the rod 24, third from the bottom and which stays provide the connection between rods 21 and 24.

At this point it is mentioned that in the absence of means to prevent, all of the rods would be displaced at random upon lifting the lower rod 15. The means provided herein to control the displacement of the rods is comprised of a U-shaped clamp 25, shown in detail in Figure 3. This clamp is welded to the underside of the rod 24 and is so located that it will straddle the bow 14 when the canopy is closed or open to the extent shown at the left in Figure 2. The legs of the U of the clamp are provided with aligned apertures through which is extended an L-shaped bolt 26. An upturned projection 27 on one leg of the clamp receives the bent end of the bolt 26 in the manner shown in Figure 3 to hold the latter against release from its position in the clamp. Obviously, by lifting this end from the receptacle 27, the bolt can be readily removed to release the clamp from the bow 14.

With the U-shaped clamp 25 in position, as shown in Figure 3, the rod 24 is held stationary with the bow 14 and when the handle 19 is lifted to raise the rod 15, the rod 21, second from the bottom, breaks outwardly and upwardly, moving in the arc indicated by the arrows at the right of Figure 2, finally coming to rest in the position shown in solid lines on the opposite side of Figure 1. In this position, a portion of the side of the canopy is raised and it is in this position usually that merchandise is unloaded from the body.

The intermediate stay 23 is elongated or provided with an extension b overreaching its pivot rod 24. This extension and its purpose is clearly shown in Figure 4. The purpose of the extension is to provide a support and displacement leverage for the lower rod 15 when the latter is in partially raised position. Normally, this extension b extends upwardly as apparent in Figure 1, but as the lower sections of the canopy are raised, the stay 23 rotates to bring the extension in the position shown in the other views or reverse to its inoperative position simultaneously with the upward movement of rod 15, and when thus in position, sufficient leverage is created thereby to urge rod 21 outward preparatory to a closing action of the canopy when the rod 15 is pulled downward.

Immediately above the rod 24 is another movable rod 28, connected by stays 29 to rod 24. This rod 28 is connected in a similar manner to one of the stationary ridge rods 12 by stays 30. By removing the U-clamp 25 from the bow 14, all of the rods may be displaced in the manner shown in broken lines in Figure 2 to fully collapse the canopy opening one entire side or both sides of the body 10 as may be desired to expedite loading or unloading, as the case may be.

It will be observed in Figures 1 and 2 that the ends of the rods supporting the canopy 20 longitudinally are bent at c in the direction of the common axis of rotation thereof, that is, in a plane parallel with and overlying the walls of the end members 11. Thus, the rods are held against longitudinal displacement and at the same time, are securely anchored in the ends 31 of the canopy 20 which conform to the ends 11 of the body.

The foregoing description deals with a canopy and frame whose rods extend the entire length of the vehicle body and whose sides are of identical construction and independently manipulatable. It is apparent that without changing the design, or departing from the intent herein shown, the frame and cover can be divided into longitudinal sections so that portions of one or both sides may be raised to gain access to portions of the body without raising an entire side of the canopy. This would only entail the addition of hinging rods 17 and so placing them along the body to accommodate the shortened, longitudinal rods of the frame. Other and similar changes and modifications may also be made without departing from the spirit and intent of the invention as fall within the scope and meaning of the appended claims.

What is claimed is:

1. A canopy and frame for vehicle bodies including arcuate shaped end members having interconnecting parallel ridge rods, a plurality of rods whose ends overreach the arcuate surfaces of said end members, and spaced relatively downward over the arcuate surfaces of said end members, the lower of which is constrained to move on an axis corresponding to the arc of said end members stays pivotally interconnecting said rods and disposed in transverse relation to the rods whereby each provides a minor rotating axis for the other to raise and lower the sides of said canopy in sections defined by pairs of said rods, at least one of said stays being elongated to extend beyond its pivotal connection in closed position and adapted, when inverted, to underlie a lower rod to sustain said canopy in open position.

2. A canopy and supporting frame for vehicle bodies, said frame comprising end members curved at their tops and interconnected by ridge rods, movable rods parallel with said ridge rods and each other, spaced downward along the curve of said end members, the lower of which is constrained to move in an arc corresponding to the curve of said end members, stays connecting said rods together at spaced longitudinal intervals whereby movement of the lower rod will effect successive movement of the companion rods, in minor arcs, each operating on its own individual axis through said connecting at least one of said stays of each side of said frame being extended beyond its pivotal point to assume a position underneath the lower of said rods when inverted to provide leverage facilitating the closing of said frame, and a flexible cover conforming to said frame.

3. A canopy and frame for vehicles comprising end members connected by ridge rods at their tops and correspondingly curved along their upper edges, a rod on either side of said end members, each having an arm at one end extending inwardly of the body of the vehicle and pivoted to an end member intermediate its sides to constrain said rods to move in an arc corresponding to the curve of said end members, canopy supporting rods intermediate and in parallel relationship with said ridge rods and said side rods and interconnected by spaced stays whereby each rod will serve as the individual rotative axis of a companion rod when said side rods are raised and lowered to open and close said canopy, at least one of said stays on each side of said frame being extended beyond its pivotal point to assume a position beneath a side rod when inverted, to sustain the frame in raised position and to afford leverage for said side rods to facilitate the closing action of said canopy.

4. A collapsible canopy and an articulated frame therefor, a pair of relatively parallel side rods constrained to travel in an arc on a horizontal plane, a plurality of intermediate rods, links connecting said intermediate rods, one with the other and with said side rods, each intermediate rod serving as an individual axis for a companion rod whereby upward and downward movement of said side rods will effect successive movement of said intermediate rods to raise and lower said canopy, said rods being retained in elevated position by their own weight, and leverage means afforded by at least one link on each side of said frame for overcoming the weight of the elevated rods to facilitate the closing of said canopy.

5. In a collapsible canopy and frame, a pair of side rods, each having an arm on one end at right angles to the rod and pivoted to constrain the rod to move in an arc on a horizontal plane, a series of relatively parallel rods intermediate said side rods and disposed in the path of the arcuate travel of said side rods, stays connecting said intermediate and side rods for successive movement on minor arcs when said side rods are manipulated and adapted to sustain said rods in overcentered position when elevated, a canopy conforming to said frame, at least one of said stays on each side of said frame being extended beyond its pivot point at one end to underlie a side rod when inverted to afford leverage to overcome the sustained elevated position of said rods when the side rod is thrust downwardly to facilitate the closing of said canopy.

6. In a collapsible canopy and frame, a series of curved, transversely disposed supporting members, a plurality of longitudinally disposed and relatively spaced, parallel rods connected together for movement horizontally in an arc generally corresponding to the curve of said supporting members, a series of stays connecting said rods for relative movement in minor arcs, the connecting stays being invertible and adapted to sustain said rods in relatively collapsed position, a cover conforming to the arcuate relationship of said rods and supporting members and foldable uniformly thereby, and means carried by at least one of said stays on each side of said frame to underlie an adjacent lower rod, when inverted, to effect displacement of the raised portion of said frame when said lower rod is pulled downwardly in the operation of closing said frame.

7. A collapsible canopy and articulated frame therefor, a plurality of relatively parallel rods disposed horizontally for arcuate movement, individual stays pivotally connecting said rods together whereby each will serve as a minor rotating axis of a companion rod, certain of said stays being invertible, said stays further aiding in the retention of said rods in elevated position, a cover embracing the rod assembly and foldable thereby in uniform sections when elevated, at least one of the stays on each side of said frame being extended beyond its pivotal point at one end to underlie a lower rod when inverted, thereby providing leverage to facilitate the movement of said rods from open to closed position when a downward pull is exerted on said lower rod.

8. A collapsible canopy and articulated frame therefor, the latter including a parallel rod assembly connected together in arcuate form and to which said canopy is affixed, a series of individual stays pivotally connecting said rods together, certain of which stays are invertible, the rods of said assembly being constrained to collapse one upon the other upon upward movement of the lowermost rod of the assembly, to raise said canopy in uniform folds, the said rods being retained in collapsed position by gravity and by said stays, and means defined by an extended end of at least one of said stays adapted, when inverted, to underlie an adjacent lower rod, thereby affording leverage to overcome the effects of gravity to return the rod assembly to normal position when a downward pull is exerted on said lower rod.

JOHN N. CLARK.